(12) United States Patent
Bakulin et al.

(10) Patent No.: US 7,706,211 B2
(45) Date of Patent: Apr. 27, 2010

(54) METHOD OF DETERMINING A SEISMIC VELOCITY PROFILE

(75) Inventors: Andrey Victorovich Bakulin, Houston, TX (US); Rodney William Calvert, Houston, TX (US); Albena Alexandrova Mateeva, Houston, TX (US)

(73) Assignee: Shell Oil Company, Houston, TX (US)

( * ) Notice: Subject to any disclaimer, the term of this patent is extended or adjusted under 35 U.S.C. 154(b) by 562 days.

(21) Appl. No.: 11/671,310

(22) Filed: Feb. 5, 2007

(65) Prior Publication Data

US 2007/0195643 A1     Aug. 23, 2007

Related U.S. Application Data

(60) Provisional application No. 60/765,563, filed on Feb. 6, 2006, provisional application No. 60/866,950, filed on Nov. 22, 2006.

(51) Int. Cl.
   *G01V 1/00*     (2006.01)
(52) U.S. Cl. .......................................... 367/38; 367/73
(58) Field of Classification Search .................. 367/38, 367/73
   See application file for complete search history.

(56) References Cited

U.S. PATENT DOCUMENTS

| | | | | |
|---|---|---|---|---|
| 4,832,148 | A * | 5/1989 | Becker et al. | 181/104 |
| 5,481,501 | A * | 1/1996 | Blakeslee et al. | 367/57 |
| 6,747,915 | B2 * | 6/2004 | Calvert | 367/46 |
| 6,807,487 | B2 * | 10/2004 | Khan | 702/16 |
| 2003/0076740 | A1 | 4/2003 | Calvert | 367/38 |
| 2003/0083820 | A1 * | 5/2003 | Ren et al. | 702/18 |
| 2008/0225641 | A1 * | 9/2008 | Van Manen et al. | 367/38 |

FOREIGN PATENT DOCUMENTS

| | | |
|---|---|---|
| EP | 443234 A1 | 8/1991 |
| WO | WO2005054900 A1 | 6/2005 |

OTHER PUBLICATIONS

Bakulin, A and Calvert R., "virtual Source: New Method for Imaging and 4D below Complex Overburden", 74th annual meeting SEG, Expanded Abstracts pp. 2477-2480(2004).

(Continued)

*Primary Examiner*—Jack W. Keith
*Assistant Examiner*—Krystine Saito

(57) ABSTRACT

A seismic velocity profile in a region of interest in a subsurface formation is determined using at least the following steps.
(a) Activating a seismic source at a location n, thereby exciting a wave in the subsurface formation.
(b) Recording a wave signal trace $u_{nm}(t)$ against time t, at a seismic receiver m.
(c) Recording a wave signal trace $u_{nk}(t)$ against time t at a seismic receiver k.
(d) Cross correlating the wave signal traces $u_{nm}(t)$ and $u_{nk}(t)$ to obtain $u^{conv}_{nmnk}(t)$.
(e) Repeating these steps, for different locations n;
(f) Summing $u^{conv}_{nmnk}(t)$ over all locations n, to obtain a signal trace $u^{vs}_{mk}(t)$ which corresponds to the signal received by the seismic receiver k from the virtual source at the position of seismic receiver m;
(g) Deriving the seismic velocity based on the time of first arrival of the wave in $u^{vs}_{mk}(t)$ and the predetermined distance between the seismic receiver m and the seismic receiver k.

14 Claims, 4 Drawing Sheets

OTHER PUBLICATIONS

Bakulin, A and Calvert R., "virtual Shear Source: New Method for Shear Wave Seismic Surveys", 75th annual meeting SEG, Expanded Abstracts pp. 2633-2636(2005).

Bakulin, A and Calvert R., "The virtual Source Method: Theory and case study", 2006 Geophysics.

Zhao, X et al"Shear waves from near-offset VSP survey and applications", 75th annual meeting SEG, Expanded Abstracts pp. 2629-2632 (2005).

R. Allnor et al "Inversion of seismic surface waves for shear wave velocities", 67th annual meeting SEG, Expanded Abstracts pp. 1921-1924 (1997).

"Well Logging in non-technical language", by David Earl Johnson and Kathryn E. Pile pp. 167-168, published 2002 by PennWell Books, ISBN: 0878148256.

* cited by examiner

METHOD OF DETERMINING A SEISMIC VELOCITY PROFILE

CROSS REFERENCE TO PRIOR APPLICATION

The present application claims the benefit of U.S. Provisional Application No. 60/765,563, filed 6 Feb. 2006, and of U.S. Provisional Application No. 60/866,950, filed 22 Nov. 2006.

FIELD OF THE INVENTION

In one aspect, the present invention relates to a method of determining a seismic velocity profile in a subsurface formation.

BACKGROUND OF THE INVENTION

A seismic velocity profile in a subsurface formation may be obtained employing the so-called check shot (also known as "well shoot" or "velocity survey") technique. The check shot technique is described in, for instance, on pages 167 and 168 of "Well Logging in non-technical language," by David Earl Johnson and Kathryne E. Pile, published 2002 by PennWell Books, ISBN 0878148256.

A conventional check shot technique includes generating multiple shots from a seismic source located in a selected position, usually close to a wellhead. Shots are detected at different locations along a bore hole extending below the wellhead, by a receiver that is moved along the bore hole.

Alternatively, a set comprising a plurality of receivers may be located in the bore hole, in which case only a single shot would be required.

A complex overburden may lead to erroneous velocity profiles when conventional check-shots and zero-offset vertical seismic profiles (VSP) are used.

When there is a complex transmission medium between the set of seismic sources and the region of interest, such as for example a complex overburden, the extraction of velocity profiles from check shots is a challenging task. First arrival waveforms may be distorted and difficult to pick as a result of the complex transmission medium, and the fastest arrival may not even come along the shortest path between the source and the receiver, thus making it difficult to relate arrival time to velocity.

This could be alleviated by placing the source in the bore hole, or well, so that the travel-path of the first arrival is short and close to a straight line between the source and the receiver. In practice, however, it is cumbersome to place and operate a physical source downhole.

Another difficulty with conventional check shots is that they measure only P-wave velocity from first arrivals. Shear waves, even if emitted from the surface source or generated by P-S conversions in the overburden, arrive later, and are difficult to unravel and pick. Hence a shear wave check shot is difficult, if not impossible, to obtain using conventional check shot techniques.

SUMMARY OF THE INVENTION

In accordance with one aspect of the invention, there is provided a method of determining a seismic velocity in a subsurface formation, comprising the steps of (a) providing two or more seismic receivers in the subsurface formation at predetermined distances from one another;

(b) selecting a seismic receiver m from the two or more seismic receivers as the location of a virtual source;

(c) selecting another seismic receiver k from the two or more seismic receivers;

(d) activating a seismic source at a location n, thereby exciting a wave in the subsurface formation;

(e) recording a wave signal trace $u_{nm}(t)$ against time t, at the seismic receiver m;

(f) recording a wave signal trace $u_{nk}(t)$ against time t at the seismic receiver k;

(g) cross correlating the wave signal traces $u_{nm}(t)$ and $u_{nk}(t)$ to obtain $u^{conv}_{nmnk}(t)$;

(h) repeating steps (d) to (g) inclusive, for different locations n;

(i) summing $u^{conv}_{nmnk}(t)$ over all locations n, to obtain a signal trace $u^{vs}_{mk}(t)$ which corresponds to the signal received by the seismic receiver k from the virtual source at the position of seismic receiver m;

(j) deriving the seismic velocity based on the time of first arrival of the wave in $u^{vs}_{mk}(t)$ and the predetermined distance between the seismic receiver m and the seismic receiver k.

A full seismic velocity profile may be determined by repeating the steps (c) to (i) inclusive, using a different seismic receiver k at a different predetermined distance from the seismic receiver m, and deriving, in step (j), the seismic velocity profile based on the times of the first arrivals of the wave in $u^{vs}_{mk}(t)$ for all k.

BRIEF DESCRIPTION OF THE DRAWINGS

The invention will now be illustrated in more detail, by way of example with reference to the drawing, wherein.

DETAILED DESCRIPTION OF THE EMBODIMENTS

Figure 1:
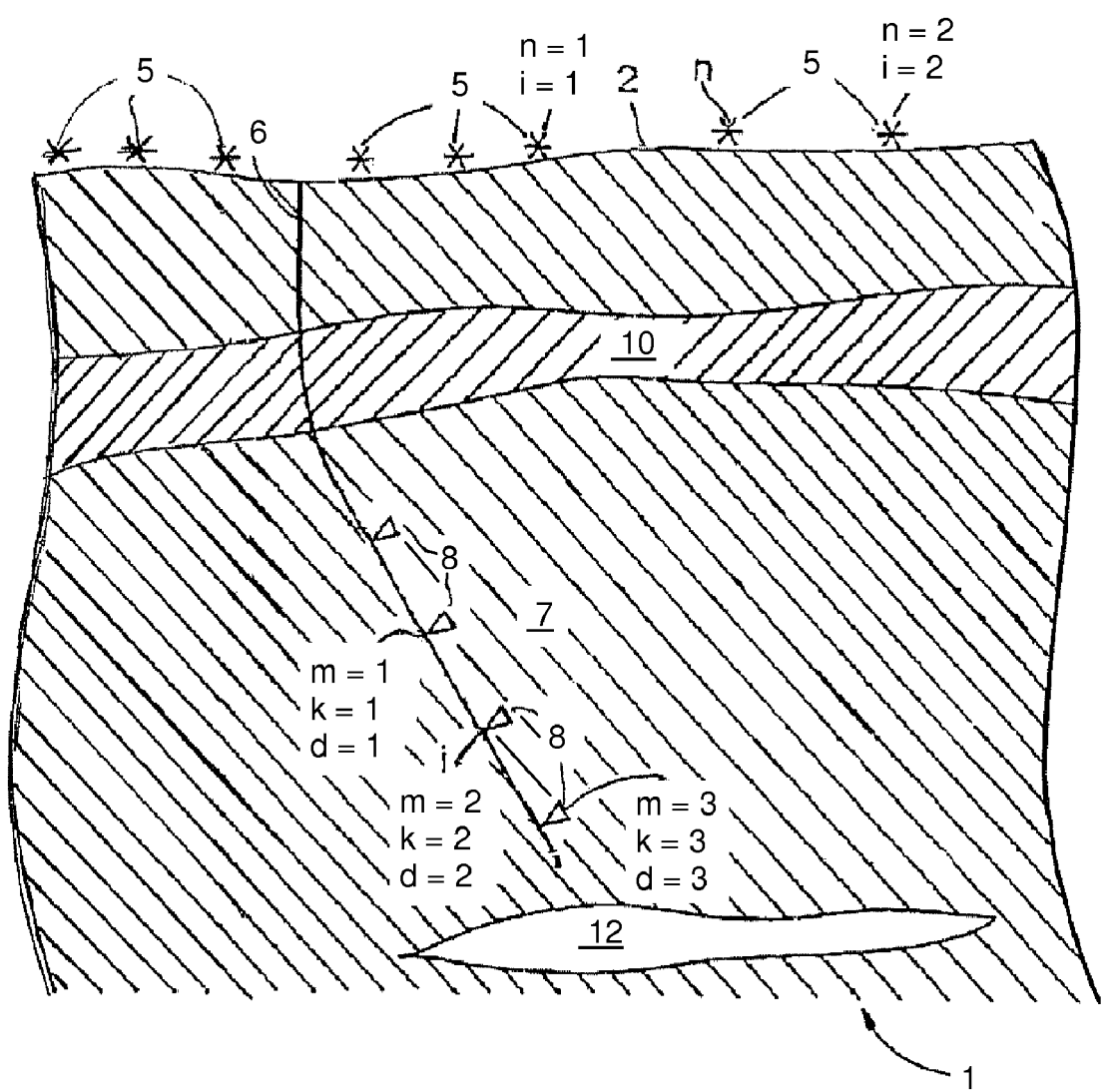
FIG. 1 shows schematically and not to scale an arrangement of seismic sources and seismic receivers in a deviated bore hole, for carrying out embodiments of the method of the present invention.
Figure 2:
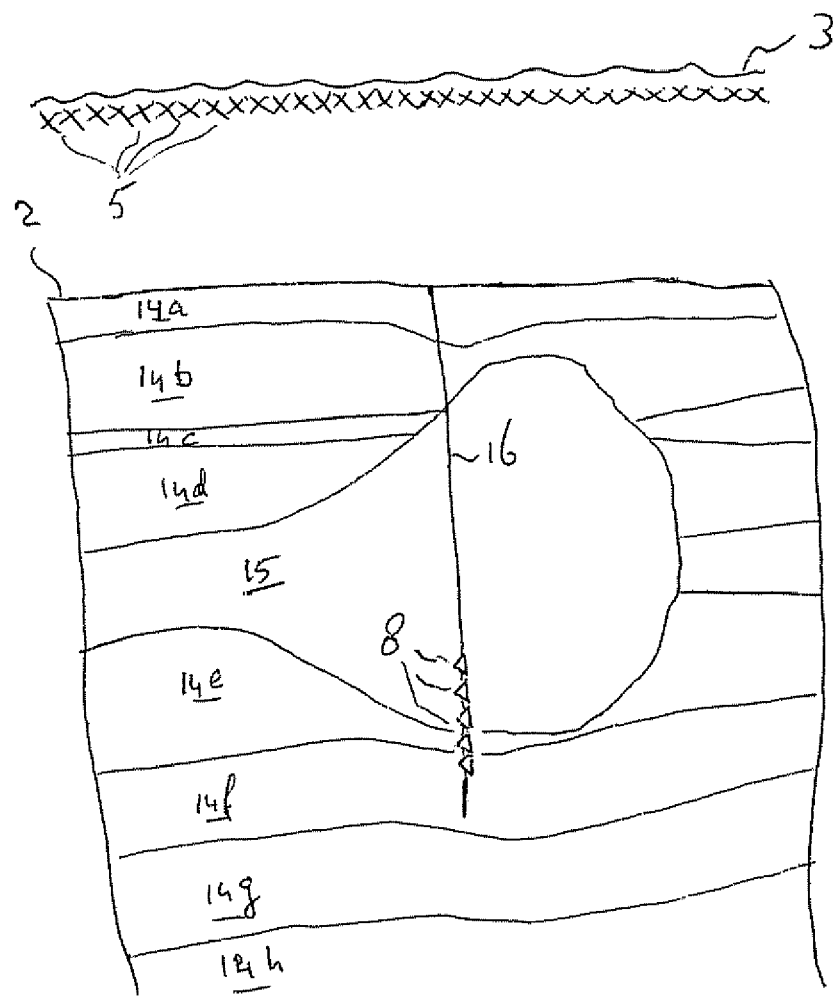
FIG. 2 shows schematically and not to scale an arrangement of seismic sources and seismic receivers in a vertical bore hole for carrying out virtual check shots.

The present virtual check shot technique overcomes the challenges associated with conventional checkshot techniques, by redatuming the seismic traces to create a virtual source at one or more downhole seismic receivers, which may comprise a geophone. When the seismic receiver at the location of the virtual source and the other seismic receivers are located below the most complex part of the section, the obtained velocity profiles are not distorted by the overburden.

By measuring the travel time of a first arrival wave from the seismic receiver at the location of the virtual source to another seismic receiver, a local seismic velocity may be determined. This will hereinafter be referred to as a virtual check shot.

When the travel times of the first arrival waves from the virtual source to a number of seismic receivers below it, a seismic velocity profile may be constructed that is insensitive to overburden complexity. The virtual check shot can correct for overburden of any complexity since no velocity information between the surface and the seismic receivers is required.

Furthermore, benefit may be made of P-S conversions that often occur in the overburden, to create a pure Shear Virtual Source in the borehole. The first arrival from such a source, which is easy to pick, would be an S-wave, yielding a shear-velocity profile.

In U.S. Pat. No. 6,747,915 a method has been reported for seismic imaging, employing the signals from a set comprising a plurality of seismic receivers in such a way that it appears as if the seismic waves originate from a source at the location of one of the seismic receivers located down hole. Such a source is then called a virtual source, to distinguish it from a real source. U.S. Pat. No. 6,747,915 describes a method of seismic imaging a subsurface formation using a set of seismic sources i and a set of seismic receivers j, wherein there is a complex transmission medium between the two sets, which method comprises the steps of:

(a) recording with the set of seismic receivers j the signals $u_{ij}(t)$ obtained from activating the set of seismic sources i;

(b) selecting a seismic receiver m as the location of a virtual source;

(c) selecting a seismic receiver k, wherein k is in a predetermined range around the position of seismic receiver m;

(d) selecting a seismic source n from the seismic sources i;

(e) time-reversing at least a part of the signal $u_{nm}(t)$ to obtain a time-reversed signal $u_{nm}(-t)$;

(f) convolving the time-reversed signal $u_{nm}(-t)$ with the signal $u_{nk}(t)$ to obtain the convolved signal $u^{conv}_{nmnk}(t) = u_{nm}(-t) \otimes u_{nk}(t)$;

(g) selecting a next source n, repeating steps (e) and (f) until a predetermined number of sources have had their turn;

(h) summing the convolved signals over the seismic sources n to obtain a signal $u^{vs}_{mk}(t) = \Sigma_n u^{conv}_{nmnk}(t)$, where $u^{vs}_{mk}(t)$ is the signal received by a seismic receiver at the position k from a virtual source at the position of seismic receiver m;

(i) repeating steps (c) through (h) over k;

(j) repeating steps (b) through (i) over m to generate a seismic survey with virtual sources m and receivers k; and (k) further processing the virtual source signals to obtain a seismic image.

In the present specification, including the claims, the symbol $\otimes$ means convolution.

The above described virtual source (VS) method thus takes multi-offset seismic data and converts that to data that would have been recorded in the same seismic receivers if the source would have been in the borehole, at a location coinciding with an existing seismic receiver. The conversion can be entirely data-driven—it is not needed have a velocity model of the medium to create VS data.

U.S. Pat. No. 6,747,915 does not disclose checkshots. It has now been contemplated that the method broadly introduced in U.S. Pat. No. 6,747,915 may form the basis for obtaining virtual check shots, including S-wave virtual check shots as well as P-wave virtual check shots.

The present specification contemplates applying selected features from the method broadly introduced in U.S. Pat. No. 6,747,915 for obtaining virtual check shots to determine velocity profiles similar to what would be the case for conventional check shots but employing a virtual source.

FIG. 1 shows schematically and not to scale a section 1 of the earth having a surface 2. At the surface 2 are located seismic sources 5, and in a borehole 6 are located seismic receivers 8. The part of the borehole 6 in which the seismic receivers 8 are located, lies in a region of interest 7 in a subsurface formation under a complex transmission medium in the form of complex overburden 10. A reflector 12 may also be located in the region of interest, of which a seismic image may be made.

The first step of the method according to the present invention is conventional: recording with a set of the seismic receivers 8 the signals obtained from activating a set of the seismic sources 5. Equivalent to activating a set of seismic sources is respectively activating a single seismic source at various different locations.

It will be understood that the seismic wave that is emitted by a seismic source 5 at a location n and received by a seismic receiver 8 at a location j generates a signal varying with time, which signal consists of a part that comes from the seismic wave that passes through the complex overburden 10 towards the seismic receiver 8 and a part that comes from waves that travel all the way down to the reflector 12 and that are reflected back to the seismic receiver 8. The first part of the signal is called the direct part of the signal, which would typically be relevant for check shots. The latter part of the signal contains valuable target information, typically relevant for seismic imaging. It is an object of the present invention to suppress distortions in the direct part of the signal caused by the seismic waves travelling through the complex overburden 10.

In the formulae that will be used to explain the invention, the signals can be referred using the symbol $u_{5i,8j}(t)$, wherein $5i$ refers to a selected seismic source 5 and $8j$ to a selected seismic receiver 8; however, for the sake of clarity the '5' and the '8' will be left out from the symbol. Thus the signals are correspondingly identified as $u_{ij}(t)$, wherein i refers to a seismic source and j to a seismic receiver.

In order to suppress the distortions, Applicant proposes to designate one of the seismic receivers 8 as a virtual source at the position of that seismic receiver, and to treat (redatum) the signals $u_{ij}(t)$ such that a signal is obtained that originates from waves travelling from the virtual source positioned at seismic receiver 8.

Thus the next step of the method according to the present invention is selecting a seismic receiver 8m as the location of a virtual source.

Then a seismic source 5n is selected from the seismic sources 5i. From the signals $u_{ij}(t)$ the signal $u_{nm}(t)$ is selected and at least a part of the signal trace $u_{nm}(t)$ is time-reversed to obtain time-reversed signal trace $u_{nm}(-t)$. Time reversal is just trace reflection about time zero, thus a trace from time 0 to time t becomes from time −t to time 0. An example of the part of the signal that is time-reversed is the signal due to the direct wave, which is that part of the signal that is received with seismic receiver 8m that comes from the seismic wave directly travelling from the source 5n towards the seismic receiver 8m through the complex overburden 10.

The virtual source is assumed to be at the position of the seismic receiver 8m, and it is an object to reconstruct what would be the direct wave between the location 8m and 8k if a real seismic source would have been positioned at location 8m. It is an object to obtain such a virtual signal, that originates from the virtual source m and is received at a seismic receiver $8k$, from the signals from the sources $5n$. Best results are achieved when the source aperture is such that the energy generated by the seismic sources $5i$ passes through both the seismic receiver $8m$ (the one that was designated as the location of the virtual source) and the seismic receivers $8k$ (i.e. along the borehole $6$).

Having selected the seismic receiver $8k$, whereby k is at a predetermined range around the position of seismic receiver $8m$, the time-reversed signal $u_{nm}(-t)$ is convolved with the signal $u_{nk}(t)$ to obtain the convolved signal $u^{conv}_{nmnk}(t) = u_{nm}(-t) \otimes u_{nk}(t)$.

In order to get the convolved signals for the seismic sources n, a next source n (or location) is selected, and the above steps, which result in the convolved signal, are repeated. Then the convolved signals are summed over the seismic sources n (or locations n) to obtain a signal trace $u^{vs}_{mk}(t) = \Sigma_n u^{conv}_{nmnk}(t)$, which may be referred to as a virtual signal trace. The virtual signal $u^{vs}_{mk}(t)$ is the signal received by a seismic receiver at the position k from a virtual source at the position of seismic receiver m. This signal is free from distortions that originate from the direct wave travelling through the complex overburden $10$.

It is now contemplated that it is also possible, as will next be explained, to extract a seismic velocity profile from the signals by constructing a "virtual checkshot", employing the virtual source. "Virtual checkshots" may be generated from multi-offset seismic data, using signals from surface sources into down-hole seismic receivers, including conventional walk-away (WAW) vertical seismic profiling (VSP) data, 3D (vertical) seismic profiling data, or any other suitable multiple offset source configuration.

These ideas have been tested by Applicants, on an example data set from a sub-salt prospect in the deepwater Gulf of Mexico (GOM). Velocity profiles of P- and S-wave velocities have been obtained that are in good agreement with sonic logs under salt at more than 7 km depth.

The example data set was acquired employing sources in a walk-away line, and seismic receivers in a vertical well through a complex overburden including a massive salt body $15$, in deepwater as schematically shown in FIG. $2$. The salt body $15$ is located in various other earth formation layers $14a$ to $14h$. A seismic receiver tool comprising seismic receivers $8$ was lowered in a vertical bore hole $16$ associated with the vertical well. A shot line of the seismic sources $5$ was provided below the water line $3$. The surface $2$ forms the seabed. The extent of the shot line was 612 shot points at 30 m (100 ft) spacing. An airgun was used as the seismic source $5$.

A survey was shot in four passes of the same shot line, with four receiver tool settings, giving a total of 96 receiver depths (4×24). About two-thirds of the seismic receivers $8$ were in the salt body $15$, near its base, and the rest were below the salt (FIG. $2$).

Velocity estimation was, in the present examples, performed using only receivers from the same tool setting [30 m (100 ft) spacing]. However, the receiver tool may be lowered by an amount corresponding to a non-integer fraction of the receiver spacing, such that the receivers in consecutive runs may be interlaced to provide a smaller effective spacing, of for instance half the receiver spacing within a tool corresponding to 15 m (50 ft) for the present receiver tool. Possible time shifts between the acquisition lines should be documented and corrected for.

The following steps allow to create a virtual source at seismic receiver $8m$ and "record" the virtual signal transmitted from that virtual source at seismic receiver $8k$:

Taking a signal trace $u_{nm}(t)$ corresponding to activating the seismic source at location n (shot n) and recording at seismic receiver $8m$ optionally gating the first arrival and/or optionally weighing the signal and/or optionally applying a wave field separation;

Cross-correlating the, optionally gated, weighed, wave field separated, part of the trace with part of or the whole trace $u_{nk}(t)$ induced by the shot at seismic receiver $8k$;

repeating for all surface shots at different locations n;

summing the obtained cross-correlations over all surface shots n.

This yields the trace from virtual source $8m$ to seismic receiver $8k$. Reference is also made to an article by A. Bakulin and R. Calvert entitled "The virtual source method: theory and case study", as published in "Geophysics", Vol. 71(4), pages SI139-SI150. The contents of the article are herein incorporated by reference.

It is remarked that the gate size and position does not matter much, as long as it captures most of the down-going energy of the desired mode—in this case P-wave. Moreover, the exact locations of the seismic sources need not be known due to the summing of multi-offset cross correlations.

As is known, cross correlation is equivalent to convolution with a time-reversed trace.

Example 1

P-Wave Virtual Checkshot

To create the P-wave virtual source, the present example uses as input the vertical (Z) component of the VSP data. A virtual source was created at every receiver depth. A common virtual shot gather with a P-wave virtual source (PVS) located at the top-most receiver location is shown in FIG. $3(a)$. FIG. $3(a)$ thus shows the virtual signal traces $u^{vs}_{mk}(t)$ for m=1 and various k ranging from 2 to 96. The gaps at traces k=12-13 and k=60-61 are caused by dead receivers.

The virtual source "fires" a zero-phase impulse at time t=100 ms. The first arrival on the virtual signal traces is clear and easy to pick. Only picks on receivers from the same tool setting [30 m (exactly 100 ft) apart] were used for interval velocity estimation. A linear fit to the first arrival moveout provides the following P-wave velocity estimate in the region of interest: $V_p \approx 2.82$ km/s (9400 ft/s). The region of interest in the example is below the salt body $15$.

FIG. $4$ plots P-wave velocity Vp, against vertical depth d, after conversion from feet to km using 1 kft=0.30 km. FIG. $4$ shows a comparison of the virtual check shot (line $20$) as obtained above, with a standard check shot (line $21$) and a sonic log (line $22$) smoothed to the present VSP resolution of 30 m (100 ft). The first arrivals on sub-salt seismic receivers from several virtual shots gave a $V_p$ profile that is in very good agreement with the smoothed sonic. The difference between the virtual check shot and the smoothed log is zero-mean (i.e., the check shot neither underestimates, nor overestimates velocity), with average standard deviation of only about 2% and maximum deviation of 5% over a small depth interval (less than 30 m).

For this particular dataset the conventional check shot (line $21$) to sub-salt seismic receivers matched the smoothed log (line $22$) equally well, as can also be seen in FIG. $4$. This is attributed to the fact that in this case the base of salt is quite flat, allowing all first arrivals to follow the same sub-salt path (essentially vertical along the well). So, strictly speaking, the P-wave virtual check shot was not a necessity at this location—but it confirms that the virtual source would give an accurate $V_p$ profile below salt. The P-wave virtual check shot would be of greater importance in areas with more complicated overburden where check shot, log, and seismic velocities often disagree (for example due to sloping or rough salt boundaries).

Example 2

S-Wave Virtual Checkshot

The present example VSP data set was acquired with airguns in the water—they do not directly excite shear waves. Nevertheless, a shear virtual source can be created by harvesting P-S conversions that may occur at heterogeneities above the seismic receivers. Further details may be found in a paper presented by A. Bakulin and R. Calvert at the 2005 Annual International Meeting of the Society of Exploration Geophysicists in Houston, entitled "Virtual shear source: a new method for shear-wave seismic surveys", and published in Expanded Abstracts pages 2633-2636, herein incorporated by reference in its entirety. The strongest P-S conversion is thought to occur at the top of salt. We verified this by raytracing.

There is, however, no need to know where in the overburden the conversions occurred. They may occur at many places at once and be very complicated. The present VS method collapses them all to a useful virtual shear signal radiated from the shear virtual source as a simple zero-phase wavelet.

Figures 3A, 3B:
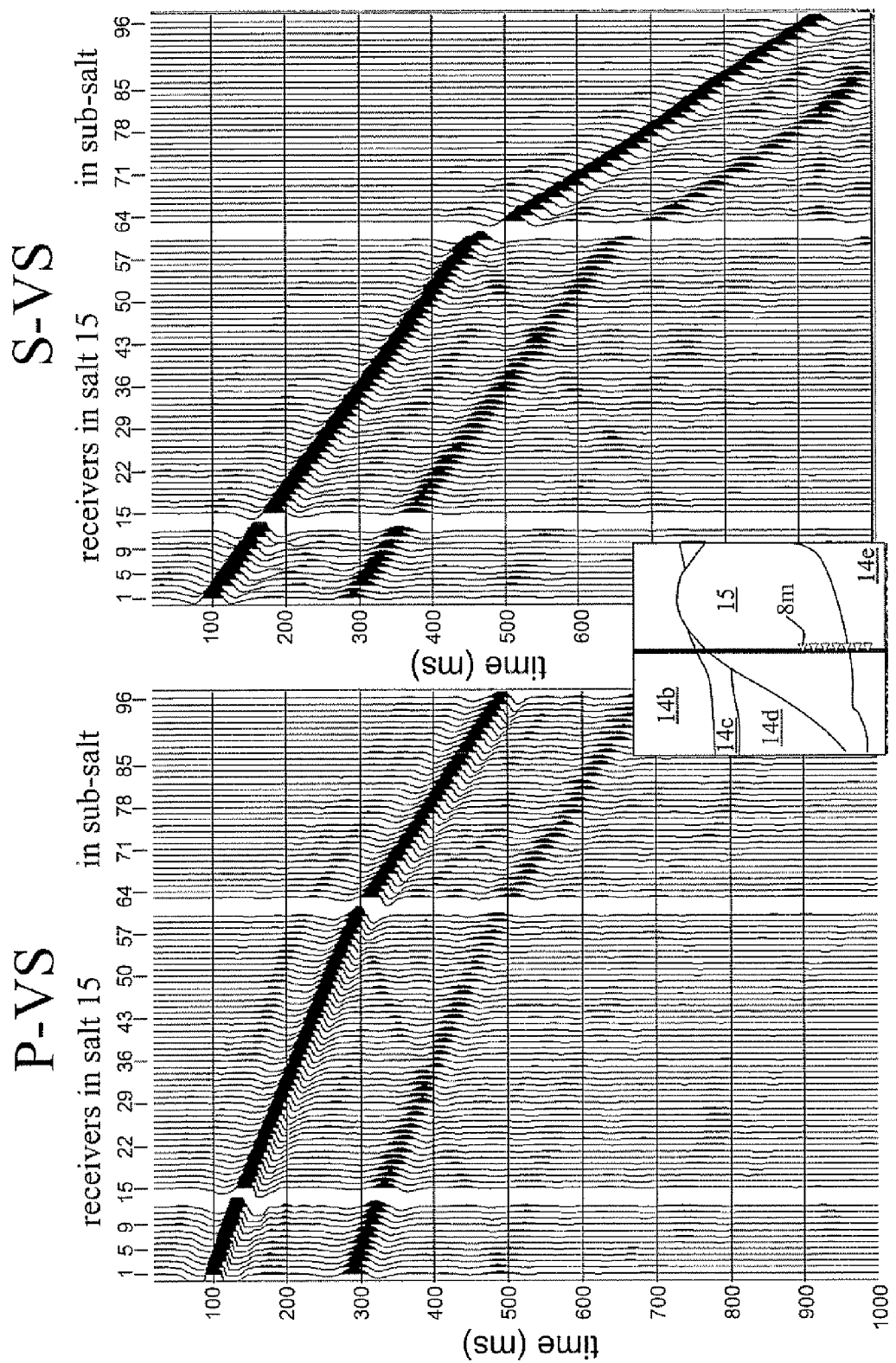
FIG. 3 shows a common virtual shot gather with (a) a P-wave virtual source and (b) an S-wave virtual source.
Figure 4:
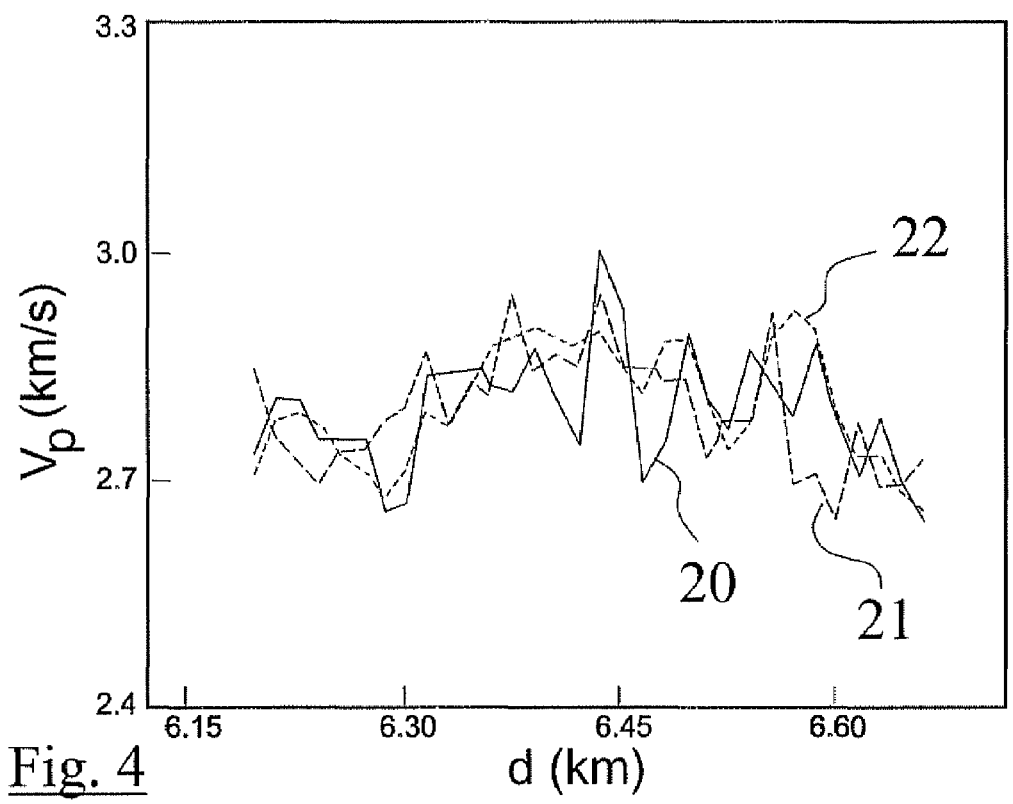
FIG. 4 shows a comparison between the virtual check shot of FIG. 3a, a conventional check shot, and a smoothed sonic log.

To create the shear VS, we used the in-line horizontal (X) component of the VSP, muting it before the top-salt P-S arrival to remove substantial P remnants from the first arrival. Resulting shear virtual signal traces are shown in FIG. 3$b$. A linear fit to the first arrival moveout provides the following shear velocity estimate in the region of interest: $V_s \approx 1.20$ km/s (4000 ft/s) (corresponding to $V_p/V_s \approx 2.35$ in the region of interest—below the salt).

Figure 5:
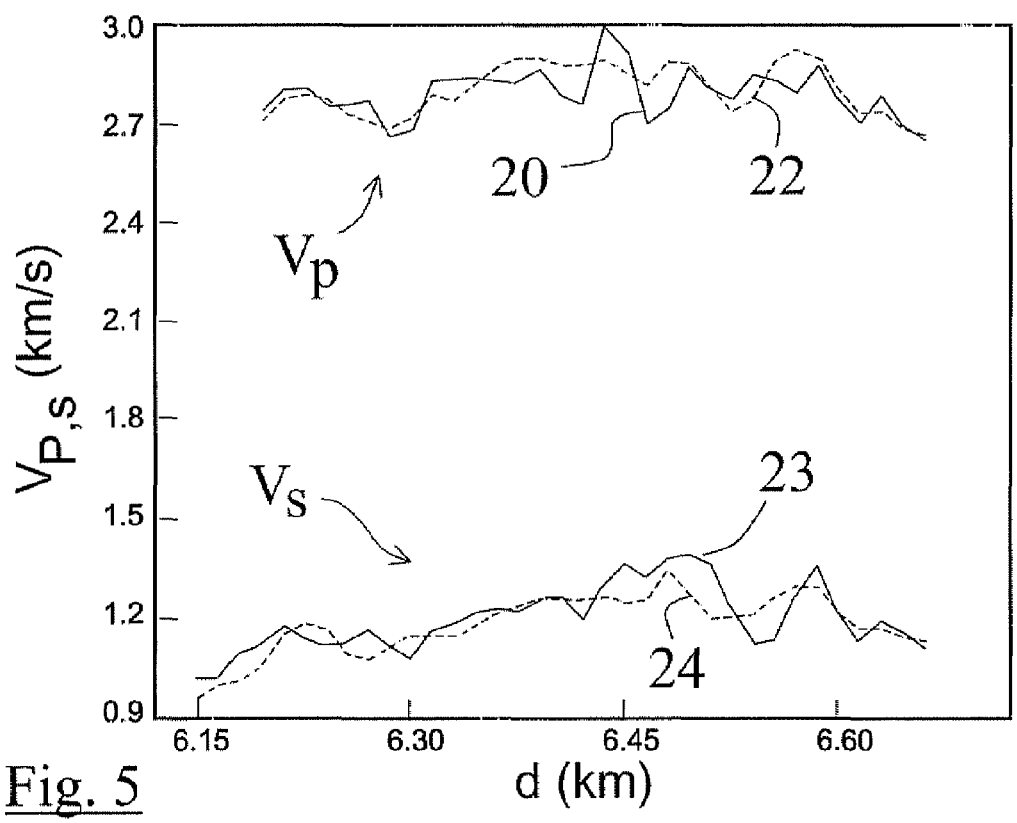
FIG. 5 shows a graphic comparison between S-wave and P-wave virtual check shots (of FIGS. 3b and 3a) versus smoothed sonic logs.

Picking the first arrival on sub-salt shear virtual signal traces, the sub-salt $V_S$ profile shown in line 23 in FIG. 5 was obtained. It matches the shear sonic log (smoothed to the present VSP resolution of 30 m), as plotted in line 24, very well. In absolute terms, P and S virtual check shots agree with the smoothed logs equally well, as verified in FIG. 5 where both $V_p$ and $V_s$ have been plotted on the same scale.

Example 3

Velocity Estimation in a Salt Body

Since virtual check shots measure interval velocities, our primary focus was on the sediments below the salt rather than on the relatively homogeneous salt. But for the sake of completeness, it is remarked that the virtual check shots may also be used to measure the average P- and S-wave velocities in salt. In the present example, the average velocities were estimated, as opposed to a detailed velocity profile in salt, mainly because it is a common practice to assign a single velocity value to salt bodies for seismic processing. Also, since the salt is much faster than sediments, interval velocities (average over 30 m) would have much larger uncertainties than interval velocities below salt.

A linear regression through the virtual source first arrivals in salt gave $V_p$=4.398±0.099 km/s (14660±330 ft/s) and $V_s$=2.52±0.11 km/s (8390±350 ft/s), corresponding to $V_p/V_s$=1.75±0.08. Smoothed logs over the same depth interval of 480 m (1600 ft) gave $V_p$=4.395±0.018 km/s (14650±60 ft/s) and $V_s$=2.502±0.011 km/s (8340±35 ft/s), whereby error bars reflect inhomogeneity rather than measurement uncertainty. So, once again, virtual check shots and well velocities are in excellent agreement.

These salt velocity estimates can be useful in seismic processing as sonic logs are typically not acquired in salt and conventional check shots can be very sensitive to distortions from top of salt geometry.

This concludes the examples.

Amongst advantages of the present virtual check shot technique is that fundamental difficulties facing conventional check shots under complicated overburdens may be circumvented, and that it may allow estimating shear interval velocities in addition to compressional velocities, even when the physical source (e.g. at the surface) emits only P-waves. The method has been shown capable of delivering very accurate estimates of P- and S-wave velocities at a great depth in and under salt. The more complicated the overburden, the better and more valuable the virtual check shot will proof to be.

This new technique is not restricted to vertical boreholes—it can be used to accurately evaluate along-the-well velocities for deviated boreholes such as shown in FIG. 1, and/or in the presence of any heterogeneity and anisotropy.

To complete the present disclosure, above-described steps of creating a virtual source at a receiver location will be further illustrated.

Select seismic sources 5$i$, wherein i=1 and i=2, and select seismic receivers 8$j$, wherein j=1, j=2 and j=3. The available signal traces are $u_{11}(t)$, $u_{12}(t)$, $u_{13}(t)$, $u_{21}(t)$, $u_{22}(t)$ and $u_{23}(t)$. Of the seismic receivers 8, the one at position j=2 may be selected to become the location of the virtual source, thus setting m=2. This will be referred to as the virtual source at the 2-position.

The first seismic receiver that may be selected is the one at the position j=1, thus setting k=1. The first physical seismic source that we select is in the position i=1, thus setting n=1. This will be referred to as a source at the 1-position.

The part of the seismic signal trace $u_{12}(t)$ that is time-reversed is the direct part $u^d_{12}(t)$, and the time-reversed signal is thus $u^d_{12}(-t)$. The time-reversed signal, $u^d_{12}(-t)$, is now convolved with the signal $u_{11}(t)$ (from the source at the n=1-position to the seismic receiver at the k=1-position), or $u^{conv}_{1211}(t) = u^d_{12}(-t) \otimes u_{11}(t)$.

Then the second seismic source is selected, at the position i=2, thus setting n=2, which will be referred to as a source at the n=2-position. Because m=2, the time-reversed direct signal is obtained by time reversing the direct part of $u^d_{22}(t)$, which gives $u^d_{22}(-t)$. The time-reversed signal, $u^d_{22}(-t)$, is now convolved with the signal $u_{21}(t)$ (from the source at the n=2-position to the seismic receiver at the k=1-position), or $u^{conv}_{2221}(t) = u^d_{22}(-t) \otimes u_{21}(t)$.

The signal obtained at a seismic receiver at the k=1 position from a virtual source at the m=2 position is $u^{vs}_{12}(t) = \Sigma_{n=1,2} u^{conv}_{n2n1}(t)$.

To obtain a seismic velocity profile the steps are first repeated over k. For the seismic receiver at position k=2, with the seismic sources at positions n=1 and n=2 and with the virtual source at position m=2, this gives the following. The time-reversed signals are $u^d_{12}(-t)$ and $u^d_{22}(-t)$, the signals are $u_{12}(t)$ and $u_{22}(t)$, and the convolved signals are $u^{conv}_{1212}(t) = u^d_{12}(-t) \otimes u_{12}(t)$ and $u^{conv}_{2222}(t) = u^d_{22}(-t) \otimes u_{22}(t)$. The virtual signal obtained at a seismic receiver at the k=2 position from a virtual source at the m=2 position is $u^{vs}_{22}(t) = \Sigma_{n=1,2} u^{conv}_{n2n2}(t)$.

For the seismic receiver at position k=3, with the seismic sources at positions n=1 and n=2 and with the virtual source at position m=2, this gives the following. The time-reversed signals are $u^d_{12}(-t)$ and $u^d_{22}(-t)$, the signals are $u_{13}(t)$ and $u_{23}(t)$, and the convolved signals are $u^{conv}_{1213}(t) = u^d_{12}(-t) \otimes u_{13}(t)$ and $u^{conv}_{2223}(t) = u^d_{23}(-t) \otimes u_{22}(t)$. The virtual signal obtained at a seismic receiver at the k=3 position from a virtual source at the m=2 position is $u^{vs}_{23}(t) = \Sigma_{n=1,2} u^{conv}_{n2n3}(t)$.

The above steps may then be repeated over m to generate a seismic survey with virtual sources m=1, 2, 3 and seismic receivers k=1, 2, 3.

In the example above, only two surface shots n=1, 2 have been explicitly treated for the sake of illustration. However, more than two surface shots are recommended in practice.

The part of the signal $u_{nm}(t)$ that is time-reversed can be the direct part, which is in this case the down-going part. However, the part of the signal can be extended to include reverberations, multiples and other scattered arrivals from the complex overburden, to this end a certain time interval is selected. In other words the time-reversed signal is gated by selecting a time-window around the first arrivals.

Suitably, the time-reversed signal $u_{nm}(-t)$ is weighted to control the radiation pattern of the virtual source.

Suitably processing the time reversed signal $u_{nm}(-t)$ further includes spectral phase and amplitude adjusting the time-reversed signal to provide desired wavelet shaping.

The recorded signals $u_{ij}(t)$ may be pre-processed, for instance to separate the contributions from up- and down-going waves. In particular, the down-going waves are utilized for creating virtual check shots where the seismic receivers are below the virtual source location.

Stated more generally, where the receiver m and the receiver k are aligned in a virtual source-to-receiver direction, cross correlating the recorded signals may be combined with removing part of the virtual signal that contains a component of the wave field at seismic receiver m other than traveling in a direction from seismic receiver m to receiver k, and removing part of the virtual signal that contains a component of the wave field at the receiver k traveling in a direction other than traveling in a direction from seismic receiver m to receiver k.

The removing of these parts from the signal traces may be done either by removing these parts from the signal traces $u_{nm}(t)$ and/or $u_{nk}(t)$ before cross correlating, or, after cross correlating, from the virtual signal trace $u^{vs}_{mk}(t)$.

By removing these parts from the signals, emphasis can be given to certain types of arrivals while artifacts arising from spurious events may be suppressed.

Directional wave field separation may be applied in addition to wave field separating into P-waves and S-waves and/or time gating around desired arrivals.

For instance, directional wave field separation may be used to create virtual check shots where the seismic receivers are above the virtual source location in which case the up-going waves are utilized. Instead of time reversing and convolving the direct arrivals, this may involve using a reflected arrival.

Thus, contributions from one or more of down-going P waves, down-going S-waves, up-going P-waves and up-going S-waves can be separated out of the signal traces and considered individually.

In the above we described a spatial configuration in which the complex transmission medium was a complex overburden, which was present between the two sets. However, the method of the present invention can be applied in other spatial configurations of subsurface formation, complex transmission medium, seismic sources and seismic receivers. For example the seismic sources i can be arranged in a borehole with a complex transmission medium between them and the seismic receivers j.

Thus the invention may suitably be used to generate virtual sources at receiver locations in many different configurations.

While these illustrative embodiments and examples have been described with particularity, it will be understood that various modifications will be readily apparent to, and can be easily made by one skilled in the art without departing from the spirit of the invention. Accordingly, it is not intended that the scope of the following claims can be limited to the examples and descriptions set forth herein, but rather that the claims be construed as encompassing features which would be treated as equivalents thereof by those skilled in the art to which this invention pertains.

We claim:

1. A method of determining a seismic velocity, comprising steps of:
    (a) providing two or more seismic receivers in the subsurface formation at predetermined distances from one another;
    (b) selecting a seismic receiver m from the two or more seismic receivers as the location of a virtual source;
    (c) selecting another seismic receiver k from the two or more seismic receivers;
    (d) activating a seismic source at a location n, thereby exciting a wave in the subsurface formation;
    (e) recording a wave signal trace $u_{nm}(t)$ against time t, at the seismic receiver m;
    (f) recording a wave signal trace $u_{nk}(t)$ against time t at the seismic receiver k;
    (g) cross correlating the wave signal traces $u_{nm}(t)$ and $u_{nk}(t)$ to obtain $u^{conv}_{nmnk}(t)$;
    (h) repeating steps (d) to (g) inclusive, for different locations n;
    (i) summing $u^{conv}_{nmnk}(t)$ over all locations n, to obtain a virtual signal trace $u^{vs}_{mk}(t)$ which corresponds to the signal received by the seismic receiver k from the virtual source at the position of seismic receiver m; and
    (j) deriving the seismic velocity based on the time of first arrival of the wave in $u^{vs}_{mk}(t)$ and the predetermined distance between the seismic receiver m and the seismic receiver k;
        further including, before step (g), at least one of removing part of the wave signal trace $u_{nm}(t)$ that contains a component of the wave field at seismic receiver m traveling in a direction other than from seismic receiver m to receiver k and removing part of the wave signal trace $u_{nk}(t)$ that contains a component of the wave field at the receiver k traveling in a direction other than from seismic receiver m to receiver k.

2. The method according to claim 1, further comprising repeating the steps (c) to (i) inclusive, using a different seismic receiver k at a different predetermined distance from seismic receiver m, wherein step (j) comprises deriving a seismic velocity profile based on the times of first arrival of the wave in $u^{vs}_{mk}(t)$ for all k.

3. The method according to claim 2, wherein step (j) comprises performing linear regression analysis through the first arrival times against distance between seismic receiver m and seismic receiver k for all k.

4. The method according to claim 1, wherein the wave comprises a shear wave.

5. The method according to claim 1, further comprising the step of gating the signal trace $u_{nm}(t)$ before cross correlating it in step (g).

6. The method according to claim 1, further comprising weighing the signal trace $u_{nm}(t)$ before cross correlating it in step (g).

7. The method according to claim 1, wherein the recorded signal traces $u_{ij}(t)$ are pre-processed to separate the contributions from up- and down-going waves.

8. The method according to claim 1, wherein the recorded signal traces $u_{ij}(t)$ are pre-processed to separate the contributions from P-waves and S-waves.

9. The method according to claim 1, wherein cross correlating in step (g) includes convolving the time reversal $u_{nm}(-t)$ of signal trace $u_{nm}(t)$ with the signal trace $u_{nk}(t)$.

10. The method according to claim 1, wherein the seismic velocity is a local seismic velocity in a region of the subsurface formation between the seismic receiver m and the seismic receiver k.

11. The method according to claim 1, wherein the wave in step j) comprises a shear wave.

12. The method according to claim 1, wherein the first arrival in step j) comprises a shear wave.

13. The method according to claim 1, wherein the virtual signal trace $u^{vs}_{mk}(t)$ includes information about a shear wave.

14. A method of determining a seismic velocity, comprising steps of:
   (a) providing two or more seismic receivers in the subsurface formation at predetermined distances from one another;
   (b) selecting a seismic receiver m from the two or more seismic receivers as the location of a virtual source;
   (c) selecting another seismic receiver k from the two or more seismic receivers;
   (d) activating a seismic source at a location n, thereby exciting a wave in the subsurface formation;
   (e) recording a wave signal trace $u_{nm}(t)$ against time t, at the seismic receiver m;
   (f) recording a wave signal trace $u_{nk}(t)$ against time t at the seismic receiver k;
   (g) cross correlating the wave signal traces $u_{nm}(t)$ and $u_{nk}(t)$ to obtain $u^{conv}_{nmnk}(t)$;
   (h) repeating steps (d) to (g) inclusive, for different locations n;
   (i) summing $u^{conv}_{nmnk}(t)$ over all locations n, to obtain a virtual signal trace $u^{vs}_{mk}(t)$ which corresponds to the signal received by the seismic receiver k from the virtual source at the position of seismic receiver m; and
   (j) deriving the seismic velocity based on the time of first arrival of the wave in $u^{vs}_{mk}(t)$ and the predetermined distance between the seismic receiver m and the seismic receiver k;
   wherein cross correlating the recorded signals is combined with removing part of the virtual signal that contains a component of the wave field at seismic receiver m traveling in a direction other than from seismic receiver m to receiver k, and with removing part of the virtual signal that contains a component of the wave field at the receiver k traveling in a direction other than from seismic receiver m to receiver k.

* * * * *